United States Patent
Stutz et al.

(10) Patent No.: US 10,185,032 B2
(45) Date of Patent: Jan. 22, 2019

(54) TIME MEASUREMENT CIRCUIT AND OPTOELECTRONIC DISTANCE METER HAVING SUCH A TIME MEASUREMENT CIRCUIT

(71) Applicant: HEXAGON TECHNOLOGY CENTER GMBH, Heerbrugg (CH)

(72) Inventors: Reto Stutz, Berneck (CH); Simon Bestler, Langenargen (DE); Rainer Wohlgenannt, Klaus (AT); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 250 days.

(21) Appl. No.: 15/167,945

(22) Filed: May 27, 2016

(65) Prior Publication Data

US 2016/0349368 A1    Dec. 1, 2016

(30) Foreign Application Priority Data

May 29, 2015   (EP) .................................... 15169990

(51) Int. Cl.
*G01S 17/08* (2006.01)
*G01S 17/10* (2006.01)
(Continued)

(52) U.S. Cl.
CPC ............ *G01S 17/08* (2013.01); *G01S 7/4865* (2013.01); *G01S 17/10* (2013.01); *G04F 10/10* (2013.01)

(58) Field of Classification Search
CPC ........ G01S 7/4811; G01S 7/491; G01S 7/497; G01S 17/32; G01S 7/4915; G01S 17/10
See application file for complete search history.

(56) References Cited

U.S. PATENT DOCUMENTS 7,379,016 B1   5/2008   McEwan
7,911,589 B2   3/2011   Siercks
(Continued)

FOREIGN PATENT DOCUMENTS

CN   103439700 A   12/2013
EP   1 876 469 A1   1/2008
(Continued)

OTHER PUBLICATIONS

European Search Report dated Nov. 12, 2015 as received in Application No. EP15169990.7.
(Continued)

*Primary Examiner* — Luke D Ratcliffe
(74) *Attorney, Agent, or Firm* — Maschoff Brennan

(57) ABSTRACT

Some embodiments of the invention relate to a time measurement circuit for an incoming signal. In some embodiments, the time measurement circuit has a comparator stage, for generating a comparator output signal depending on a fulfillment of a criterion by the incoming signal, wherein exceeding or falling below a threshold value is defined as the criterion. Furthermore, a digitization stage is provided, for sampling, which is performed at a defined sampling rate, of an input signal fed to the digitization stage and converting it into digital data containing sampled values for the input signal, and an evaluation unit for determining a chronological location for the incoming signal by evaluating the digital data.

24 Claims, 8 Drawing Sheets

(51) Int. Cl.
*G01S 7/486* (2006.01)
*G04F 10/10* (2006.01)

(56) References Cited

U.S. PATENT DOCUMENTS

| | | | |
|---|---|---|---|
| 7,920,248 B2 | 4/2011 | Satzky et al. | |
| 2010/0026984 A1* | 2/2010 | Lewis | G01S 7/4811 |
| | | | 356/5.01 |
| 2015/0116695 A1 | 4/2015 | Bartolome et al. | |
| 2016/0047904 A1* | 2/2016 | Mellot | G01S 7/4865 |
| | | | 356/5.03 |

FOREIGN PATENT DOCUMENTS

| | | |
|---|---|---|
| WO | 2008/009387 A1 | 1/2008 |
| WO | 2011/076907 A1 | 6/2011 |

OTHER PUBLICATIONS

Feng Zhi-hui, Liu En-hai, High-accuracy TDC for laser range finder, Optics and Precision Engineering, vol. 18, No. 12, Dec. 2010, pp. 2665-2671.

* cited by examiner

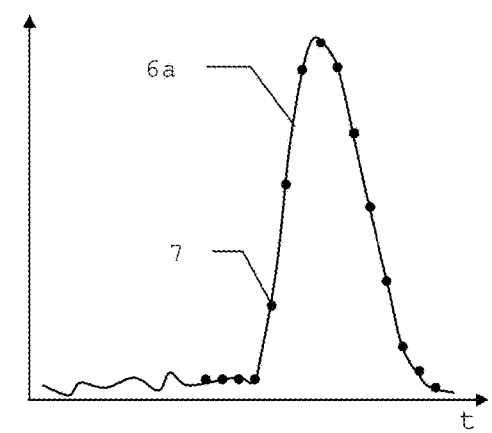
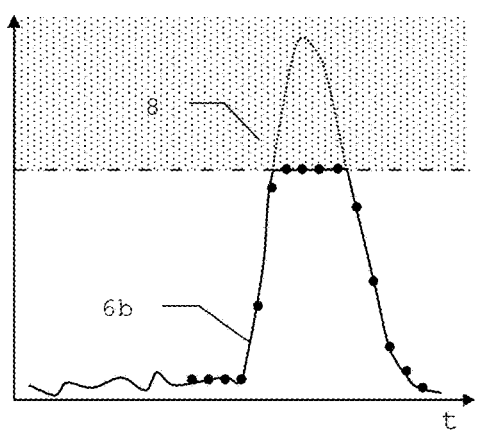
Fig. 3a   Fig. 3b
Fig. 4

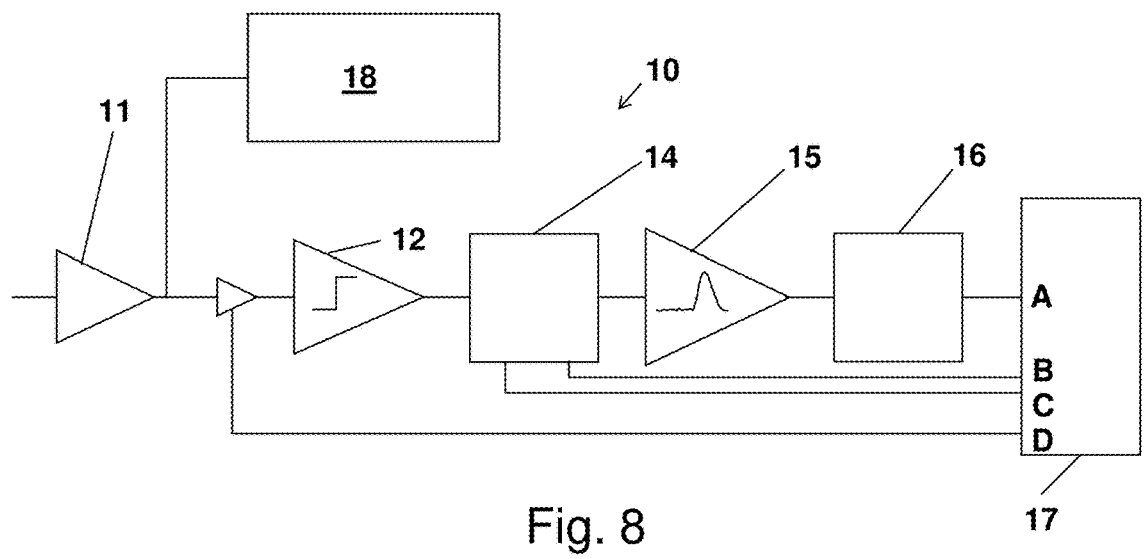
Fig. 8
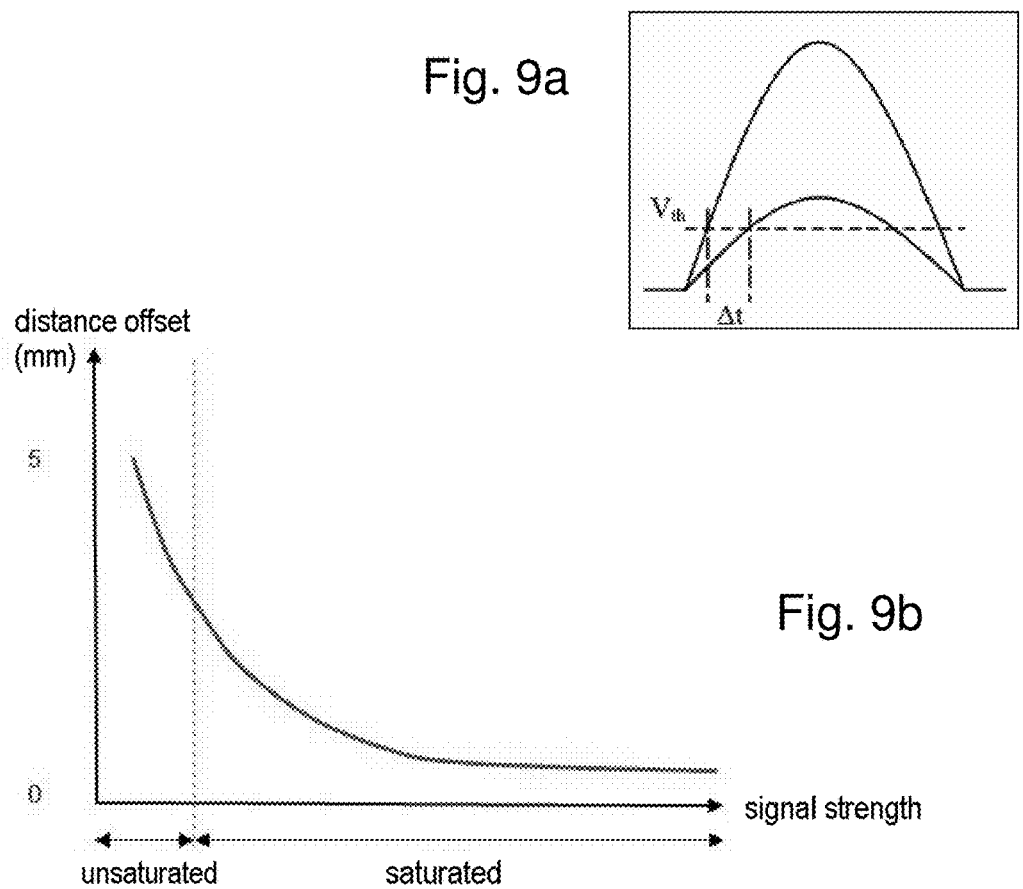
Fig. 9a
Fig. 9b

TIME MEASUREMENT CIRCUIT AND OPTOELECTRONIC DISTANCE METER HAVING SUCH A TIME MEASUREMENT CIRCUIT

FIELD OF THE INVENTION

The invention relates to a time measurement circuit and an optoelectronic distance meter having such a time measurement circuit.

BACKGROUND

Various principles and methods for determining the desired distances are known in the field of optical and/or optoelectronic distance measurement. One approach is to emit pulsed electromagnetic radiation, for example, laser light, toward a target to be measured and subsequently to receive an echo from this target as the backscattering object, wherein the distance to the target to be measured can be determined on the basis of the runtime of the pulse. Such pulse runtime meters (ToF, i.e., time-of-flight) have prevailed in many fields as standard solutions over time.

Two different approaches are used for detection of the returning pulse.

In the so-called threshold value method, a light pulse is detected when the intensity of the radiation incident on a detector of the distance meter used exceeds a specific threshold value, wherein this is usually implemented with the aid of a comparator stage (i.e., a comparator). This threshold value prevents noise and interfering signals from the background from being detected incorrectly as a useful signal, i.e., as backscattered light of the emitted pulse.

One disadvantage of the threshold value method is that, for example, in the event of weak backscattered pulses, as are caused, for example, by greater measurement distances, a detection is no longer possible if the pulse intensity falls below the detection threshold, i.e., below the threshold value.

A further disadvantage is either the complex structure and/or the lack of precision with respect to the time determination of the comparator signal (i.e., excessively low resolution) of many known time-to-digital converters (TDCs) typically used up to this point in the scope of the threshold value method.

The other approach is based on the sampling of the backscattered pulse (WFD method, waveform digitization). A returning signal is thus detected in this case, the radiation acquired by a detector is sampled, the pulse is identified within the sampled range, and finally the location thereof is determined chronologically with high precision. By using a sufficient number of sampled values and/or summation of the received signal which is synchronous with the emission rate or the coding sequence of the transmitted signal, a useful signal can also be identified under unfavorable circumstances, so that greater distances or background scenarios which are noisy or subject to interference can also be managed. Digital phase measurement is a subvariant of this measurement method.

The limited linear modulation range of the electronic receiver circuit is also problematic in this so-called waveform digitization method (WFD method). At close range, the signal can saturate the receiver, so that the shape of the transmitted signal is no longer correctly ascertained and the runtime is determined with insufficient accuracy.

It is described in WO 2008/009387 in this case for pulse runtime measurements (ToF, Time-of-Flight) that alternatively—i.e., depending on which signal dynamic range of the receiver is addressed by the returning signal—either the threshold value method (with strong returning signal) or the sampling waveform digitization method WFD (with weaker returning signal) can be used.

The inadequate comparability of cross-method determined distance values and the additional structural and/or computer expenditure to effectively provide two completely separate and different circuits (or at least channels) for a distance meter and—with regard to the calibration and finally the calculation of the desired distance value—to have to follow two completely different methods have proven to be disadvantages of this combination of different methods (depending on which signal dynamic range is addressed).

SUMMARY

Some embodiments of the invention provide a time measurement circuit (TDC: time-to-digital converter), which is improved and/or less complex in structure, and which can advantageously be used in the scope of the threshold value method (in particular in the field of optoelectronic distance measurement). An increase of the time measurement accuracy is also to be able to be achieved especially in this case.

Some embodiments of the invention may include a distance meter in which either the application of the threshold value method or the WFD method is provided depending on the signal dynamic range of the returning pulse, reduce the complexity of the structure of the circuits required for this purpose and/or to increase the cross-method comparability of the measured values and/or to reduce the calibration/computation effort for the respective different methods. In particular, providing a high distance measurement accuracy over an expanded dynamic range is also to be enabled in this case.

The invention relates—according to a first aspect—to a time measurement circuit for an incoming analog signal, in particular for use as a part of a receiving circuit of a distance meter and in this case for measuring a point in time for a returning light pulse. The time measurement circuit has in this case

- an (in particular analog) comparator stage for generating a comparator output signal depending on a fulfillment of a criterion by the incoming analog signal, in particular wherein exceeding or falling below a threshold value is defined as the criterion,
- a digitization stage (ADC, analog-to-digital converter) for sampling, which is performed at a defined sampling rate, of an input signal fed to the digitization stage and converting it into digital data containing sampled values for the input signal, and
- an evaluation unit for determining a chronological location for the incoming analog signal by evaluating the digital data.

According to the invention, a signal generating stage is now interconnected between the comparator stage and the digitization stage, which is designed to generate and output, in a chronologically fixed manner dependent on the content of the comparator output signal, a shape signal, which is designed for post-sampling interpolation ability, of known shape and in particular known amplitude.

The evaluation unit then determines the desired time to be measured for the incoming analog signal while using a chronological interpolation of the values contained in the digital data and the known shape of the shape signal.

Methods for precise time interpolation (taken per se) are described, for example, in document WO 2011/076907.

This first aspect of the invention is thus, in other words, still on the analog signal level, i.e., even before the step of the digitization, which is unavoidably subject to information content loss, in a manner directly chronologically fixedly dependent on the output of the comparator signal, to generate a shape signal—which is still or once again analog—(using a signal generating stage), which has the known shape and is especially designed with regard to its shape and optionally amplitude to interpolate the values, which are obtained after the sampling and digitization, in an improved and less undetermined manner or to fit the shape of the shape signal into the discrete values obtained during the sampling with the least possible uncertainty. Experiments have shown that according to the invention, the chronological location for the form signal can thus be determined with picosecond accuracy (possibly even subpicosecond accuracy).

The typically output comparator signal generally has an extremely steep flank and can actually only assume two values (comparable to 0 and 1).

During the time determination, when the comparator output signal changes from 0 to 1, the indeterminacy exists in the prior art when observing this comparator output signal at a specific observation rate (i.e., in particular sampling rate) when the change from 0 to 1 took place precisely within one cycle of this rate.

According to the invention, however, the comparator output signal itself is not even observed, but rather it is used to generate a shape signal of optimized shape in a still analog manner (i.e., without adding sampling rate uncertainties) and relay it into the ADC, so it can then be sampled and digitized therein at a defined rate. The digital data with the sampled values (i.e., in each case discrete values of the shape signal for the respective sampling points in time) can now be used according to the invention, with the aid of the known shape of the signal, to fit this shape signal into the values on the digital level (or in other words: to interpolate the values) and therefore to determine the chronological location of the shape signal more precisely (which naturally in turn enables the inference of the chronological location of the comparator output signal and therefore the point in time of the exceeding of the threshold value by the actual incoming signal to be measured—for example, a distance measurement signal returning from the target).

The shape signal is designed according to the invention (optionally also adapted to the cycle rate of the sampling by the analog-to-digital converter ADC) so that, after sampling and digitization, it can be reconstructed (i.e., interpolated) in the digital world with lowered time and amplitude uncertainty—in comparison to imaginary sampling of the comparator output signal (i.e., so that the shape and optionally amplitude of the shape signal can in principle be fitted into the sampled discrete values with lower or entirely without chronological uncertainty).

The signal generating stage can be designed in particular such that the shape signal is designed as pulsed with defined pulse width and changes its intensity asynchronously to the sampling rate of the digitization stage multiple times within the pulse width, in particular progressively or continuously (in this case especially at least continuously over the duration of at least one cycle of the sampling rate).

The amplitude of the shape signal can additionally be designed so that it is optimized with respect to the modulation range of a downstream analog-to-digital converter (thus advantageously so that essentially the entire modulation range of the ADC is covered by the signal). A negative relevance of quantification errors is thus reducible.

The term "asynchronous" in conjunction with the statement "signal varying in its amplitude multiple times asynchronously in relation to the sampling rate" is not to be understood in this case as "push-pull" (i.e., not a phase shift by 180°), but rather at time intervals other than the cycle width (in particular for example, continuously changing the signal strength, i.e., slope of the amplitude of the signal not equal to zero and not equal to "infinite", and/or also not close to zero and not close to "infinite").

Shape and in particular also amplitude of the shape signal are thus intentionally designed to have suitable values provided for carrying out subpicosecond-accurate interpolation after the sampling. The signal generating stage is thus focused on the output of a shape signal (with known shape and amplitude) designed for post-sampling interpolation ability.

The shape signal can be formed in this case, for example, as:
bell-shaped,
sawtoothed,
triangular,
trapezoidal, or
stepped (having steps, the width of which does not correspond to the width of the cycle of the sampling rate, in particular, for example, with randomized step width).

The shape signal can additionally have in this case an amplitude and/or a signal strength curve, which as much as possible comprises a substantial part or even the entire A/D converter input voltage range. The quantification errors of the ADC are thus reduced and possibly even completely negligible. In addition, the influences of the differential nonlinearity (DNL), which is linked to the quantification, thus average out. DNL is understood in the present case as the difference of the quantification voltage from the next digital value of an ADC.

In the circuit, the signal generating stage of the TDC according to the invention can be implemented in this case, for example, by at least one flip-flop circuit, in particular a D flip-flop, or by ultrafast logic gates, in each case with at least one downstream low-pass filter.

As a special embodiment, the signal generating stage can be housed together with the comparator stage in a joint electronics unit, for example, in a correspondingly fast FPGA or in the form of a mixed signal ASIC.

After the sampling and digitization, the sampled discrete values (which are contained in the digital data) are then used as an interpolation function, i.e., as output data for carrying out a possibly picosecond-accurate interpolation. On the basis of these values and the known shape of the shape signal, the shape signal (as an interpolant) is fitted or reconstructed on the digital level on the basis of evaluation methods (algorithms) known per se, and subsequently the chronological location of the reconstructed and fitted signal is read out. This then also enables direct inferences about the precise chronological location of the comparator output signal and therefore also about the actually desired point in time, which is to be measured, for the incoming signal.

The evaluation unit is thus designed to determine a time (or a point in time) for the incoming analog signal while using a chronological interpolation of the values contained in the digital data and the known shape of the shape signal.

Furthermore, the invention relates to an optoelectronic distance meter according to the time-of-flight principle, wherein it contains the above-described time measurement circuit.

In detail, the distance meter thus has:
- at least one light source for emitting at least one pulsed light signal, in particular a laser light pulse, onto a target object,
- a receiving circuit having a detector (i.e., a receiving photodiode such as an avalanche photodiode (APD), a positive-intrinsic-negative diode (pin diode), a multi-segment APD, or a single-photon avalanche diode array (SPAD)) for detecting the light signal returning from the target object and signal processing electronics downstream from the detector, and
- an evaluation unit for determining a distance to the target object.

The time measurement circuit according to the invention then forms at least parts of the signal processing electronics and the evaluation unit.

Using the time measurement circuit according to the invention, in this case, a point in time can now be determined in an improved manner, for example, for when the returning detected light signal exceeds a predefined threshold.

However, if one observes in this case the pulsed returning detected light signal over its width, the point in time of exceeding a predefined threshold value within this pulse width is thus dependent on the amplitude of the received pulse.

In one exemplary embodiment, from this aspect, the comparator stage of the time measurement circuit can be designed and provided with criteria such that a comparator output signal is generated and output in each case for a rising flank and for a falling flank of the returning detected light signal. For this purpose, for example, the comparator stage can have two comparator components, a first comparator for the rising flank and a second comparator for the falling flank.

The evaluation unit of the time measurement circuit is then furthermore also designed for determining a first time, that for the rising flank, and a second time, that for the falling flank.

Finally, the desired distance to the target object is then determined depending on the determined first time (that for exceeding the threshold value by the rising flank) and the determined second time (that for falling below the threshold value by the falling flank).

The pulse width determined in this manner is thus a measure of the signal strength of the received signal. This signal strength measurement even functions in the event of electrical overload of the receiving unit. Signal-strength-dependent distance determination or runtime errors may be compensated for or remedied entirely using this twofold comparator circuit.

It can thus be taken into consideration by this measure that different distances are not derived in each case depending on the amplitude level of the returning pulse (for targets which are actually at the same distance, for example, but have different reflectivity).

A further possible embodiment for the comparator stage can also have three comparator components (comparator assemblies), wherein two of them trigger for the rising flank and one triggers for the falling flank. Such a device has the advantage of also being able to measure received signals from double targets which are spaced apart closely. This is because in the case of such targets, it can occur that the electrical received pulses generated by the light detector overlap, and thus the steepness of the rising flank is increased in relation to a single target. By means of the two comparators assigned to the rising flank, this steepness can be acquired and evaluated. Therefore, double target measurements, which can typically occur on object edges, may be recognized and corrected.

By means of an assembly made of four comparator components, even a subpicosecond-accurate distance measurement to double targets can additionally be enabled. The four parameters (i.e., reflectivities and distances to double targets, i.e., effective reflectivity and distance in each case to two targets) can thus be resolved.

Further advantages—to be able to handle extremely high signal dynamics in an improved manner—can be implemented in that, for example—as known per se—a two-channel receiver is provided, having a low noise, in particular linear-amplitude WFD channel for the lower (in particular linear) signal range combined with a "threshold value" channel for the middle and upper signal range, in which the above-described time measurement circuit is now newly provided.

Using such a distance measuring device, improved, i.e., higher, measurement accuracy can then also be provided over large signal dynamic ranges (for example, a dynamic range of the received signal, which is expanded by 1 to 2 orders of magnitude, can be managed with correspondingly high distance measurement accuracy throughout). Previous distance meters having 14 bit resolution typically have a usable dynamic range of 10 bits, using the above-described time measurement circuit according to the invention (TDC measuring device)—according to practical experiments—the range can be expanded by at least 4 to 6 bits.

In detail, according to such a distance meter exemplary embodiment, the signal processing electronics thus have a first channel and a second channel.

The time measurement circuit according to the invention as described multiple times above is provided in this case in the first channel, and it is therefore designed for the case of an activation of the detector, which is caused by the returning light signal, in its middle and upper amplitude range.

The second channel is provided for the case of an activation of the detector, which is caused by the returning light signal, in its lower, linear amplitude range and has for this purpose, in a manner typical for WFD:
- a digitization stage for sampling, which is performed at a defined sampling rate, of the detected light signal and converting it into digital WFD data containing sampled values and
- an evaluation unit for determining a chronological location of the detected light signal in consideration of a pulse shape, which is depicted on the basis of the sampled values, for the detected light signal.

The evaluation unit of the distance meter can then finally be designed so that the distance to the target object—depending on whether the returning light signal activates the detector in the middle/upper or in the lower, linear amplitude range—is determined either with evaluation of the digital data generated in the first channel or with the evaluation of the digital WFD data.

However (for example, in a border region between activation of the detector in the lower or in the middle amplitude range/signal dynamic range), "both" types of digital data (i.e., from both channels) can optionally also be used for the determination of the distance to a target.

The above-mentioned evaluation units (of the first and second channels and the distance meter) can be provided in this case together by at least one FPGA and a microprocessor. That is to say, the evaluation units are functionally described as different evaluation units. However, they may be embodied as one or more physical units (for example, an FPGA or a microprocessor, or an FPGA and a microprocessor jointly).

Similarly to the time measurement circuit according to the invention, a further subject matter of the invention furthermore also relates to a time measurement method for an incoming signal, in particular for use in the scope of a distance measurement and in this case for measuring a point in time for a returning light pulse. In the scope of this time measurement method, the following is performed:

progressive checking of a fulfillment of a defined criterion by the incoming signal and outputting a trigger signal upon fulfilling the criterion, in particular wherein exceeding or falling below a threshold value is defined as the criterion, generating and outputting an artificial shape signal in a chronologically fixed manner depending on the output of the trigger signal, wherein the shape signal is designed for post-sampling interpolation ability and has known shape and in particular known amplitude, sampling, which is performed at a defined sampling rate, of the the shape signal and converting it into digital data containing sampled values for the shape signal, and deriving a point in time for the incoming signal by evaluation of the digital data, depending on a determination of a chronological location of the shape signal, wherein this is performed using a chronological interpolation of the values contained in the digital data and the known shape of the shape signal.

The shape signal can be designed in this case in particular as pulsed having defined pulse width and can change its signal values asynchronously to the sampling rate multiple times within the pulse width, in particular progressively or continuously. The shape signal can especially be formed, for example, as bell-shaped, sawtoothed, triangular, trapezoidal, or stepped.

Furthermore, the invention also relates—similarly to the above-described distance meter according to the invention—to an optoelectronic distance measurement method according to the time-of-flight principle comprising:

emitting at least one pulsed light signal, in particular a laser light pulse, toward a target object, detecting the light signal returning from the target object, and determining a distance to the target object depending on a point in time derived for the returning light signal, wherein this is performed using the above-described time measurement method according to the invention.

BRIEF DESCRIPTION OF THE DRAWINGS

The method according to the invention and the device according to the invention will be described in greater detail hereafter, solely for exemplary purposes, on the basis of specific exemplary embodiments, which are schematically illustrated in the drawings, wherein further advantages of the invention will also be described. In the figures:

FIG. 3a shows a schematic illustration of a sampling method for backscattered light signals according to the prior art, FIG. 3b shows a schematic illustration of the saturation problem of the sampling method, FIG. 4 shows a time curve of an incoming signal (for example, a detected light signal returning from the target), for which at least one point in time is to be determined as an example, FIG. 8 shows a block diagram of an embodiment according to the invention for the time measurement circuit, wherein this forms a part of a distance meter according to the invention having additional WFD channel, FIGS. 9a,b show the amplitude dependence of the measured runtime and a possible correction curve.

DETAILED DESCRIPTION

Figure 1A:
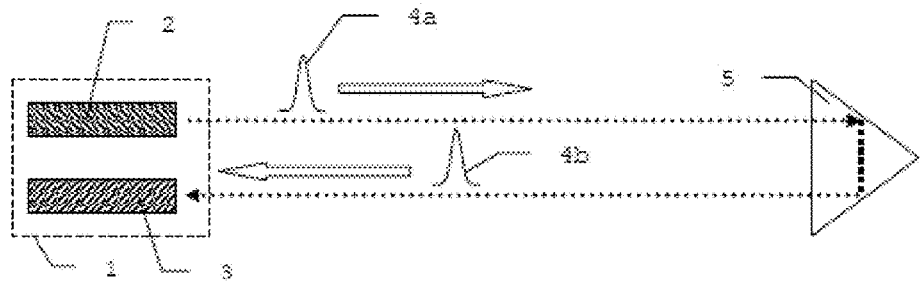
FIG. 1a shows a schematic illustration of an optoelectronic distance meter according to the prior art.

FIG. 1a shows a schematic illustration of an optoelectronic distance meter 1 of the prior art according to the pulse runtime principle. A transmitter 2 and a receiver 3 are arranged in the distance meter 1. The transmitter 2 emits a light pulse 4a, which is detected again by the receiver 3 after the reflection or backscattering on a target, for example a retroreflector 5, as the backscattered light pulse 4b. Instead of a single light pulse, according to the invention, an analog or digital coded pulse sequence or a continuously modulated transmitted signal can also be used.

Figure 1B:
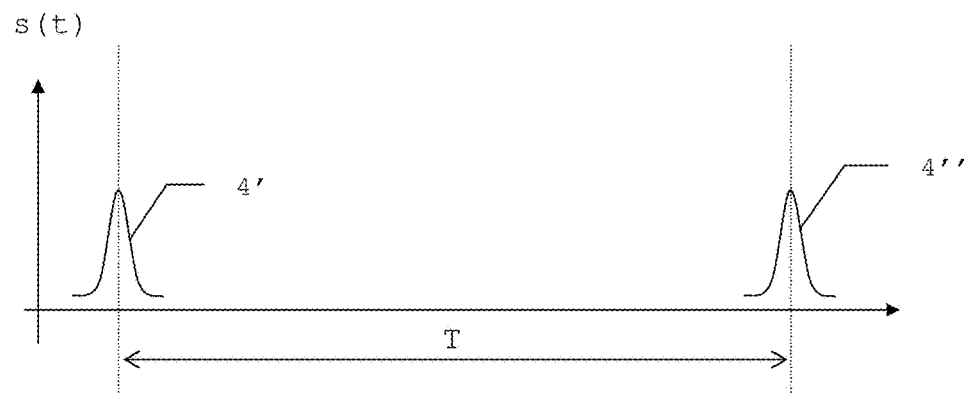
FIG. 1b shows a schematic illustration of a runtime measurement method according to the prior art.

As explained in FIG. 1b in a schematic illustration, the distance is ascertained from the runtime T as the chronological difference between the starting point in time of the emission of a light pulse 4' and the receiving point in time of the backscattered light pulse 4". The ascertainment of the receiving point in time is performed in this case by evaluation of a feature of the signal pulse s(t), for example, by exceeding a signal threshold or by focal point determination of the integrated pulse curve. In the threshold value method, other methods are also usable for measuring the runtime T, for example, the conversion of the received signal into a bipolar signal and subsequent determination of the zero crossing.

Figures 2A, 2B:
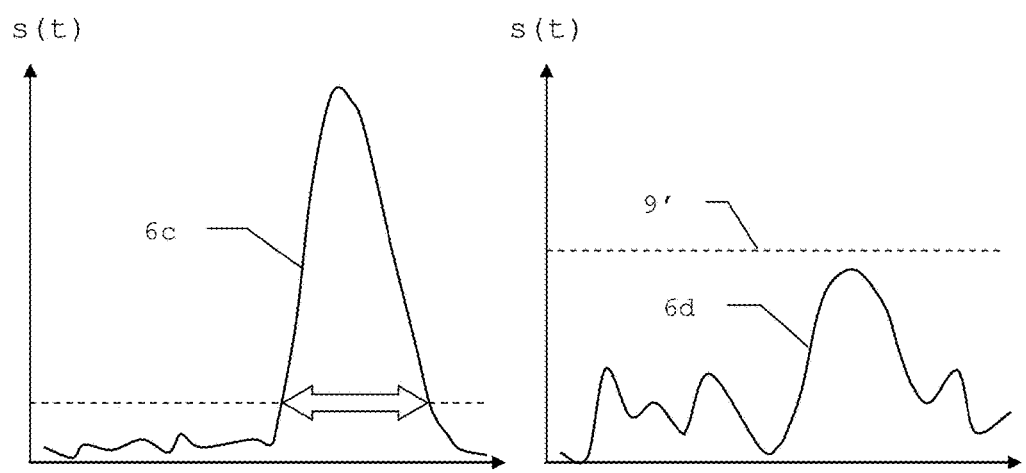
FIG. 2a shows a schematic illustration of a threshold value method for backscattered light signals according to the prior art.
FIG. 2b shows a schematic illustration of the threshold problem of the threshold value method.

In FIG. 2a, a threshold value method for backscattered light signals 6c according to the prior art is explained. To suppress noise, background components, or systematic interfering signals, for example, due to the optical and electrical crosstalk between transmitter signal path and receiver signal path, and exclude them from a detection, a detection threshold 9 (for example, in the form of a comparator component) is used. Signal intensities s(t) located below this detection threshold 9 do not result in a response of the comparator, which generates a stop signal, as the discriminator and therefore do not result in a detection. If the signal 6c exceeds the detection threshold 9 in its intensity, the detection occurs and therefore the generation of the stop signal and the registration of the receiving point in time. The output signal provided by the threshold value method is therefore dependent on the received or input signal reaching or exceeding the detection threshold 9. However, if the signal intensity s(t) always remains below a detection threshold 9', as shown in the example of FIG. 2b, no response of the discriminator (comparator) thus occurs and the signal 6d is not detected. This threshold problem of the threshold value method occurs, for example, in the case of large measurement distances or corresponding background influences, which can drive the required threshold level of the threshold signal upward. This is also the case with a proportional discriminator (constant fraction discriminator), in which the trigger threshold is varied proportionally to the maximum amplitude. In the event of small signals, the trigger threshold cannot be sufficiently reduced, since otherwise random noise would trigger receiving time marks.

The simple threshold value method typically allows lower distance determination accuracies than the sampling method (WFD principle) mentioned hereafter, at least if the received pulse is not located in the saturation of the detector.

FIG. 3a illustrates the principle of a sampling method (WFD) for backscattered light signals according to the prior art. A received signal 6a or the signal curve thereof is sampled at various points in time 7 and/or assigned time intervals, so that the signal shape may be derived. To also be able to detect large variations of the signal pulse s(t), a high dynamic response is required on the receiver side, which enables the complete acquisition or sampling of the signal 6a. Otherwise, the situation shown in FIG. 3b can occur, if parts of the signal 6b are outside the dynamic range and saturation problems of the sampling method occur. Above a saturation limit, a saturated range 8 of the receiver exists, in which no meaningfully usable sampling values of the pulse are available. The use of the sampled values for the determination of the chronological location of the pulse is then restricted to the range located below the saturation limit. A determination of the signal shape and location is then difficult, in particular in the case of a high flank steepness.

FIG. 4 shows a time curve of an incoming electrical signal, for which at least one point in time is to be determined as an example. The moderately-sized pulse in the front part of the time signal generates a first trigger event, and the second, saturated pulse in the rear part of the time signal generates a further trigger event. The comparator stage and the signal generating stage of the time measurement circuit according to the invention now generate, for each pulse, a picosecond-accurate shape signal having constant amplitude, which is supplied to a gigahertz-speed A/D converter and digitized therein. Subpicosecond-accurate time interpolations may be implemented using known algorithmic methods from the data sequence. Since this shape signal, which is fed to the A/D converter, is independent of the amplitude of the received pulses, no dynamic errors occur. The optional emphasis of the amplitude-dependent time shifts or distance offsets occurring at the comparator stage is explained for exemplary purposes in FIGS. 9a and 9b.

Figure 5:
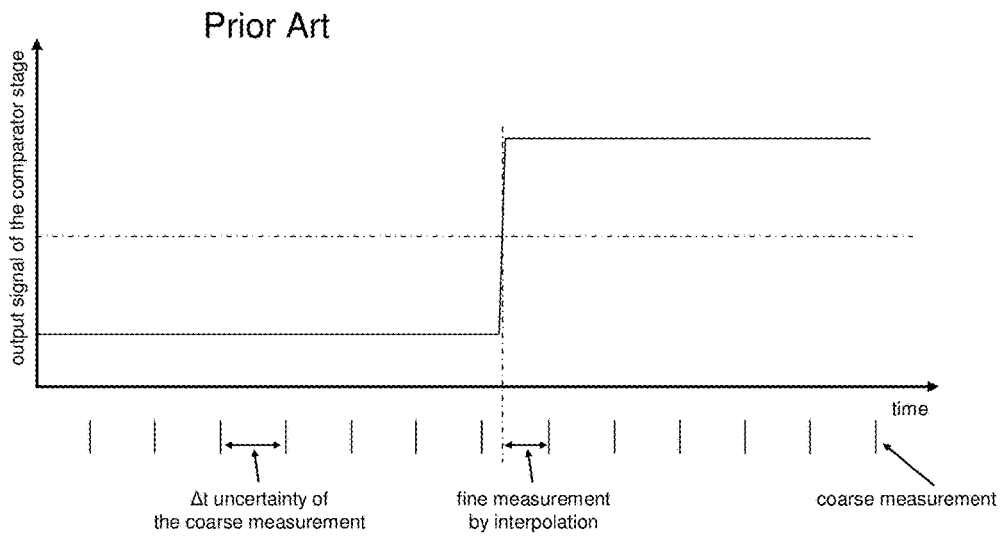
FIG. 5 shows time determination using a conventional TDC method known according to the prior art.

FIG. 5 shows the time determination using a conventional TDC method. In a first step, the time is determined in a coarse measurement, this is implemented using a quartz-accurate counter. The remaining uncertainty of the trigger point in time Δt is determined in a second step by means of a time interpolator, i.e., an additional circuit assembly. This can be a capacitor, for example, which is charged by a triggered constant current source and subsequently read out. These conventional circuit assemblies for time interpolation have generally reached an accuracy of at best 10 ps up to this point.

FIGS. 6a-6d show graphs of signal curves and sampled data over time in relation to the individual stages and units of the time measurement circuit according to the invention.

Figure 6A:
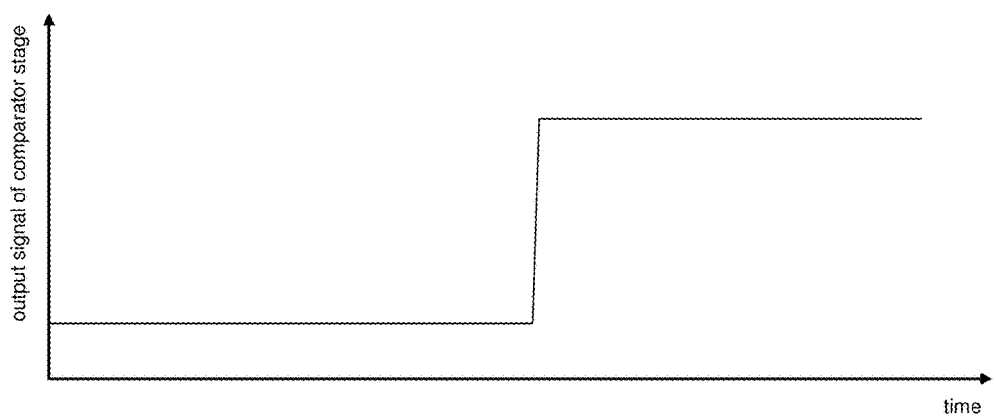
FIGS. 6a-d show graphs of signal curves and sampled data over time in relation to the individual stages and units of the time measurement circuit according to the invention.

FIG. 6a shows the output signal of the comparator stage of the device according to the invention. The step in the signal is generated when, for example, the rising flank of the incoming signal to be analyzed (for example: the signal which is generated by a light detector and then amplified) exceeds the defined threshold value. The output signal of the comparator stage then has, for example, the shape of a picosecond-speed digital step function, as shown.

The comparator stage can then be designed so that the output signal remains on top until a separate reset signal (for example, from an FPGA or DSP) is fed.

The output signal of the comparator stage is fed to the signal generating stage.

Figure 6B:
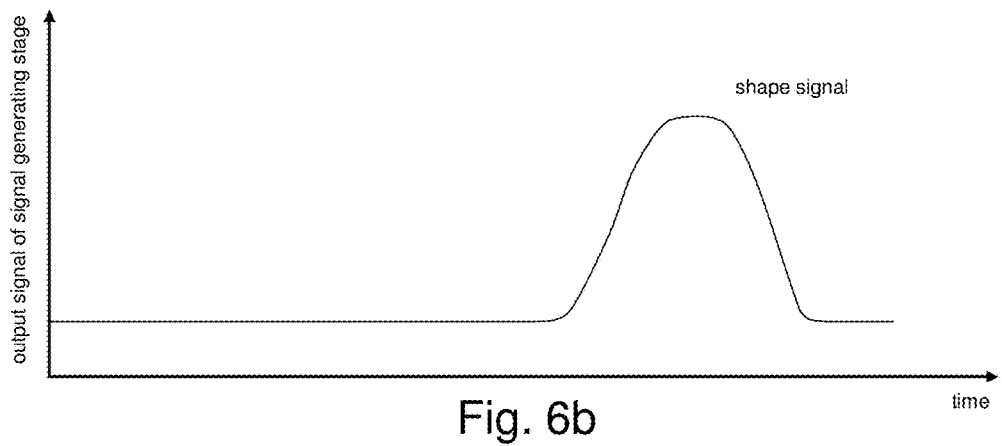

FIG. 6b shows the chronologically fixed shape signal, which is generated and output depending on the content of the comparator output signal by the signal generating stage. The shape signal is in this case a signal of known shape and in particular known amplitude, which is designed for post-sampling interpolation ability.

In the embodiment shown, the shape signal has a pulse shape, having known shape, amplitude, and width.

In a special embodiment, such a signal can be generated, for example, by a flip-flop circuit or by a logic gate.

A short rectangular pulse of defined amplitude can thus firstly be generated, for example, having a width of less than 1 ns.

This rectangular pulse can then be filtered by a corresponding low-pass filter, whereby a bell-shaped pulse (having known shape, and also having known amplitude and width, which are essentially unchanged from the rectangular pulse) arises, as shown as an example in FIG. 6b.

The generated shape signal can then be supplied to the digitization stage (i.e., for example, an ADC). This samples the signal supplied thereto at a defined sampling rate and converts it into digital data containing sampled values.

Figure 6C:
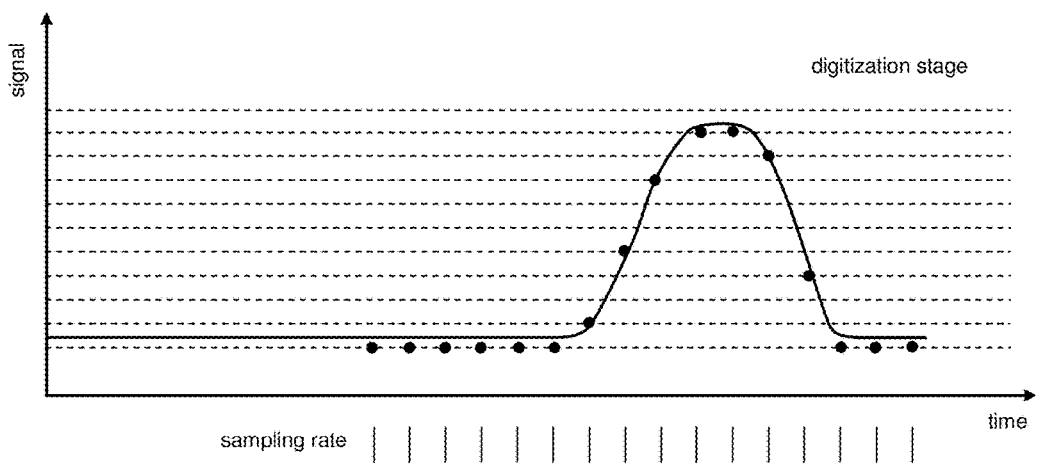

FIG. 6c shows an example of the procedure of the quantification and digitization of the shape signal. The amplitude of this artificial shape signal can in particular be selected in this case so that it covers a majority of the signal range of the ADC between the lowest-value and the highest-value bit (LSB (least significant bit) and MSB (most significant bit)).

Figure 6D:
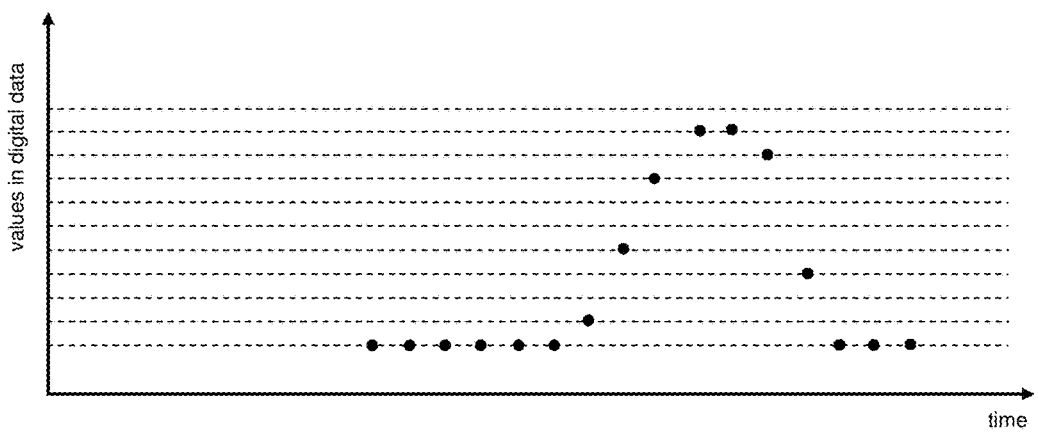

FIG. 6d illustrates the digital data generated by the digitization stage (such as an ADC), which then contain the sampled values for the input signal of the ADC (i.e., for the shape signal). In other words, the digital data thus contain a digital signal sequence having the relevant pulse information, which is then used as an input data set for the time interpolation algorithm.

The sampling rate of the digitization stage (the ADC) can be between approximately 200 MHz and 10 GHz, for example, in this case.

The sampled shape signal (i.e., the values sampled for this purpose, which are now contained in the digital data) can finally be evaluated with respect to its chronological location by way of time interpolation algorithms known per se. For example, such a time interpolation method is described in publication document WO 2011/076907, wherein time interpolation accuracies in the subpicosecond range are then achievable using such a method.

In a distance meter, in which a so-called starting pulse (optionally given by an optical starting reference pulse, which is detected) is also chronologically determined for the measurement of the runtime of the light (i.e., a first starting point in time is determined for the so-called starting pulse), it can be ensured in particular by a resampling (i.e., by a sampling rate conversion) that the identical sampling pattern is applied for the sampling of the starting pulse and the sampling of the shape signal—which then is generally used as a stop pulse here. The accuracy of the runtime determination can therefore be further increased.

The evaluation unit (optionally provided—at least partially—by an FPGA) can then determine the runtime of the light, especially in real time (i.e., for example, at a rate of greater than 1 MHz), using a corresponding waveform algorithm as the time interpolation, as the time passed between the first point in time determined for the reference pulse used as the starting pulse and the second point in time determined for the shape signal. The desired distance to the target can then be derived via this runtime.

Similarly thereto, this principle of sampling rate conversion (resampling) can also be applied for two shape signals, which are generated successively, once for the rising flank of the pulse of the actual incoming signal and once for the falling flank of the signal (which—see also the description of FIGS. 9b and 9b—can also be applied to correct a so-called range walk, which possibly occurs in the threshold value method). With reference to the embodiment of the circuit as shown in FIG. 8, wherein the pulse generator component 14 can be constructed from two flip-flops, for example, the two rectangular pulses generated by the flip-flops (for the rising flank and the falling flank) can be combined with an OR gate after the flip-flops and then fed to the low-pass filter. The second pulse is then fed to the same ADC.

FIGS. 7a to 7d show various variants for the design of the shape signal according to the principle according to the invention, wherein these are each designed for optimum post-sampling interpolation ability.

Figure 7A:
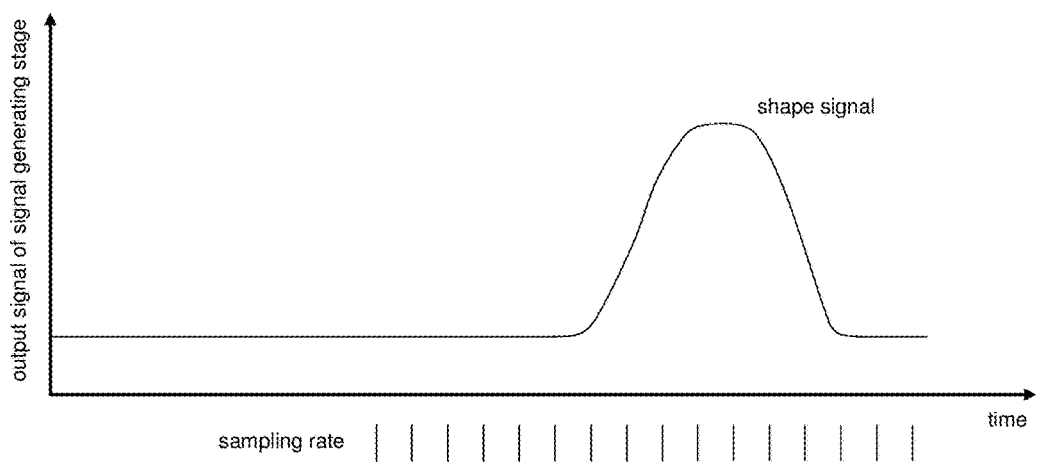
FIGS. 7a-d show different variants for the design of the shape signal according to the principle according to the invention.
Figure 7B:
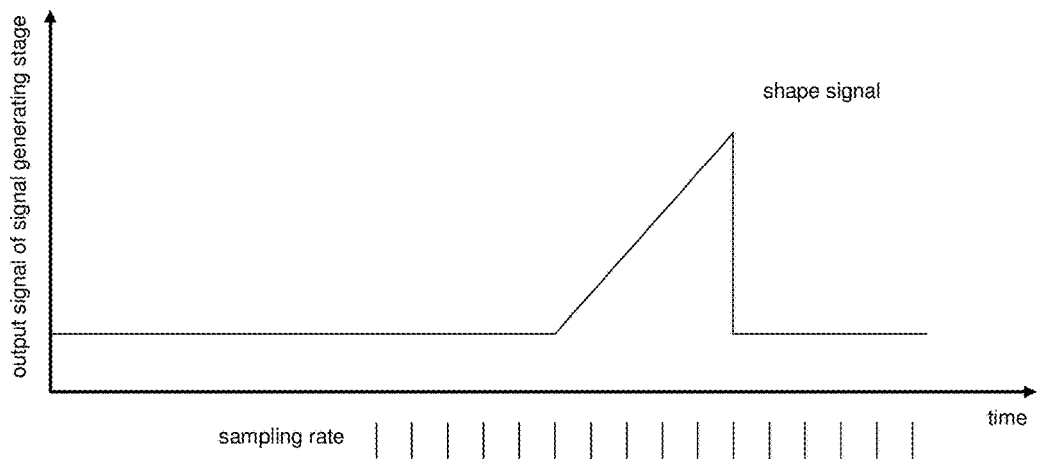
Figure 7C:
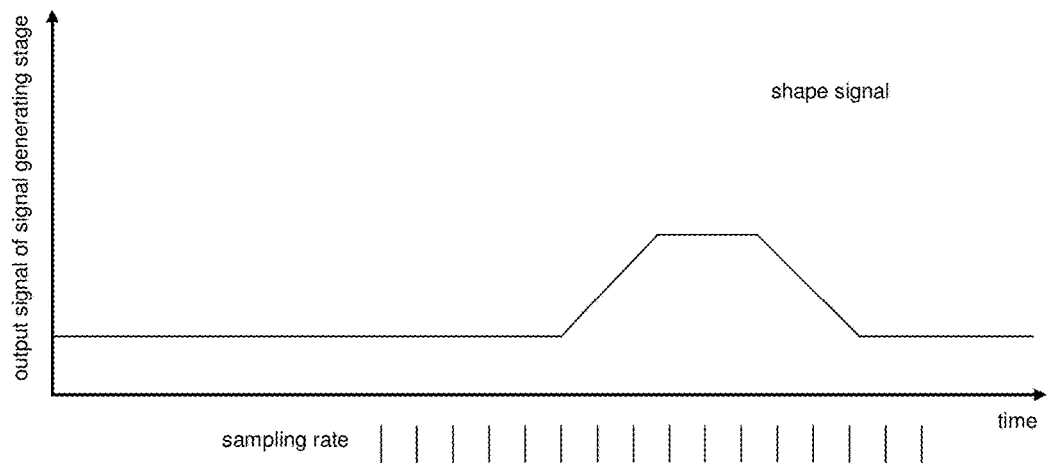
Figure 7D:
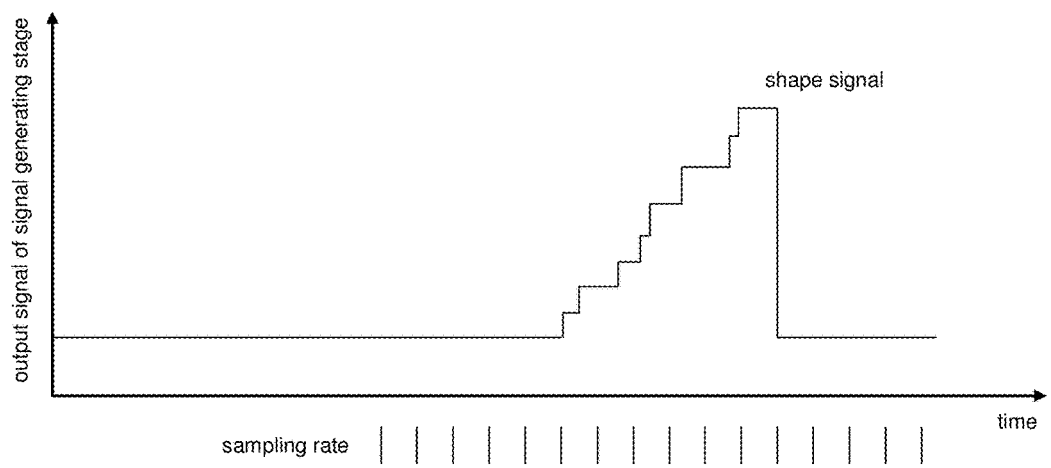

FIG. 7a shows a bell-shaped shape pulse as the shape signal, FIG. 7b shows a sawtoothed one, FIG. 7c shows a trapezoidal one, and FIG. 7d shows a stepped one.

The artificial pulses from FIGS. 7a and 7b change their signal values continuously over the entire pulse width.

The artificial pulse from FIG. 7c changes its signal values at least partially—over multiple sampling periods—continuously within the pulse width.

The artificial pulse from FIG. 7d changes its signal values multiple times within the pulse width, wherein the change takes place asynchronously in relation to the sampling rate.

FIG. 8 shows a block diagram of a time measurement circuit 10 according to the invention according to the threshold value principle (at least in a first channel of the receiving circuit) having a digital time converter ("time-to-digital converter", TDC) according to the invention. The detection signal of a photodetector (for example, APD), which is converted by a current-voltage converter (TIA, trans-impedance amplifier) 11, is fed, in the first channel (threshold value channel), to a comparator stage (discriminator) 12, which is indicated by a rising rectangular pulse. Optionally, the signal fed to the comparator 12 can be damped upstream in this case by a VGA, which is designed in particular as a VGA having controllable damping. If the signal applied to the comparator exceeds a predefined threshold value, a comparator output signal 13 is generated, which is fed to a signal generating stage having a pulse generator component 14, which can comprise, for example, two electronic flip-flop circuits (i.e., bistable trigger elements, high-speed logic gates, not shown). Using the signal generating stage, which can optionally also contain a low-pass filter 15 downstream from the pulse generator component, according to one embodiment, an analog, defined pulsed signal having a defined time curve and defined amplitude (optionally optimized to the signal range of the ADC) is generated. This synthetically generated signal is then fed to a rapid, signal-resolving analog-to-digital converter circuit (ADC) 16 having adapted time and amplitude resolution. The sampled data are processed in real-time or "pipelined" in correspondingly designed electronics hardware 17 ("FPGA"). A "field programmable gate array" is an integrated circuit (IC) of digital technology, in which a logic circuit can be programmed. The English designation can be translated as "(application) field programmable (logic) gate array". Manifold embodiments of FPGAs are known in the prior art. Various terminals of the FPGA 17 are indicated in FIG. 8, specifically "A" for the input of artificially generated, flank-triggered shape signals, which are independent of the amplitude of the original incoming signal, "B" for setting the pulse length, "C" for a "reset" at the beginning of a start/stop time window, and "D" for setting the sensitivity of the VGA. A shape signal triggered by the actual incoming signal (for example, detected light pulse, and in this case by exceeding a threshold) is thus applied to the input A. A time measurement circuit TDC is implemented using these functionalities, together with the components 14, 15, and 16 upstream from the FPGA, wherein, however, the electronic components used and the evaluation of the chronological location of the shape signal correspond in principle to those of a known WFD circuit having ultrahigh time resolution.

In a further embodiment (not shown), the time measurement circuit 10 can have an additional second signal channel 12, 13, 14, 15, 16 according to the threshold value principle.

It can differ from the above-described channel by way of a comparator 12, which triggers on the falling flank of the input signal. The FPGA 17 ascertains, together with the result from the first channel, the width of the input signal. This width is used to remedy a distance offset caused by the unknown amplitude of the actual incoming signal (i.e., a distance offset therefore caused by the discriminator 12).

In still a further specially constructed embodiment, the time measurement circuit 10 can contain a third channel 12, 13, 14, 15, 16 according to the threshold value principle. It differs from the two previous TDC channels by way of a comparator 12, which triggers on the rising flank of the input signal in the event of a signal threshold value differing from the first channel. Two measurement points are thus acquired on the rising flank, the downstream FPGA determines the slope of the flank therefrom. If the slope is not in the expected ratio to the pulse width, interference of the received signal due to a particular arrangement of the laser measurement beam in relation to the target object thus exists. For example, if the laser beam is partially incident at an object edge on the first object and an object located behind it, a double reflection thus arises. If the two objects are spaced apart closely (<1 m), the two associated electronic received pulses thus overlap and the relation between steepness of the rising flank and pulse width deviates from a previously determined reference value. Double targets, which result in overlap of received pulses, may thus be recognized, corrected or at least partially eliminated.

Alternatively, the number of the TDC channels can be increased, without the complexity of the overall distance measurement circuit substantially increasing. With a fourth channel 12, 13, 14, 15, 16 according to the threshold value principle, the individual distances assigned to the double targets can even be measured accurately in any case and without a priori assumptions.

Optionally—as indicated in FIG. 8—a conventional WFD time measurement circuit 18 can be equipped in a parallel arrangement to the above-described TDC time measurement circuit. This channel essentially consists of an amplifier stage, a low-pass filter or bandpass filter, and an A/D converter channel. The digital data generated by the ADC can be supplied in particular to the same FPGA 17 as the data of the TDC channel (or optionally the multiple TDC channels).

FIG. 9a illustrates a potentially occurring signal-strength-dependent distance error (time walk or range walk).

Depending on the level of the amplitude of the actual incoming signal, a set or oscillating threshold value (Vth) of the comparator stage of the TDC is exceeded either comparatively early or late in comparison to one another. This exceeding point in time also determines the moment relevant for the generation of the stop signal. This exceeding point in time thus now varies depending on the amplitude of the actual incoming signal, which is referred to as a "range walk error" and can be compensated for by knowing about the width of the actual incoming signal pulse. This width of the signal pulse can be determined by determining a point in time for falling below the threshold value on the side of the falling flank of the signal pulse, which can in turn be performed with the aid of a second comparator designed for this purpose.

FIG. 9b shows the generally, but not necessarily, monotonous relationship between distance offset (i.e., time walk or range walk) and signal strength, which can be performed on the basis of a pulse width measurement by means of the TDC device. The signal strength is used to compensate for the influence of the time walk or range walk (calibration).

The curve also shows in principle the systematic distance deviation, if a fixed distance is measured and the received signal is varied from very small amplitudes up to, for example, 20-fold overload. This systematic distance deviation can consistently be very reproducible.

It is apparent that the TDC is more suitable for the upper signal range up to multiple signal overload and supplies a high distance measurement accuracy there because of the nearly constant distance offset.

In the lower signal range, the TDC displays a stronger signal dependence of the distance offset. The time determination according to the WFD principle (i.e., waveform digitization directly of the actual incoming signal and determination of the chronological location by time interpolation on the basis of the values obtained directly for the signal), in contrast, has advantages in the lower signal range, since this has rather lower noise and additionally practically no signal-dependent distance offset. A conventional WFD can also retrieve accurate distance measurement from very noisy signals by way of signal accumulation.

A 2-channel distance meter according to the invention consisting of a WFD channel and a TDC channel is distinguished by a very high distance measurement accuracy, over an expanded signal dynamic range, in the submillimeter or micrometer range, and independently of the amplitude of the received signal. In the lower signal range, which typically occurs when measuring on black or wet targets, the WFD determines the distance to the object, in the event of inadequate signal-to-noise ratio (SNR), with adaptive accumulation of the digital signal vector, the SNR is additionally raised prior to the distance evaluation and the scattering of the measurement result is thus improved. When measuring on light, glossy, or reflective objects, the TDC channel is the selection which provides advantages, where the signal strengths are in the upper to saturated modulation range of the receiver. The TDC arrangement already enables submillimeter accuracy from moderate signal strengths.

Figure 10:
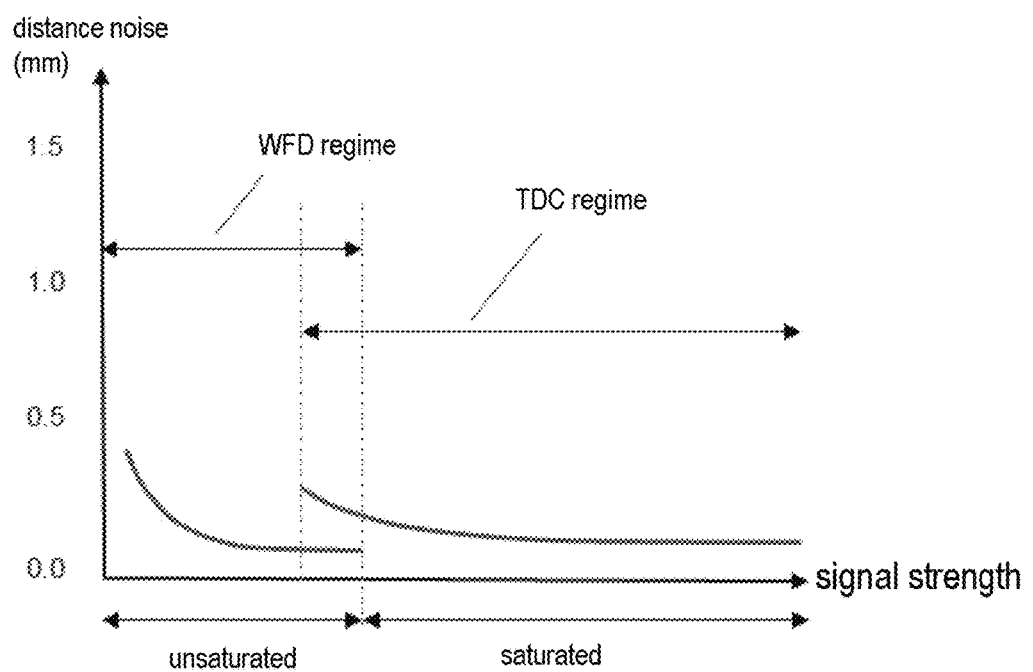
FIG. 10 shows distance noise of an embodiment according to the invention having TDC and WFD channel.

FIG. 10 shows the distance jitter (noise) of the TDC channel with the time measurement circuit according to the invention (top right curve) and the linear WFD channel (bottom left curve) in the case of single shot evaluation.

At small signal amplitudes, the WFD displays better behavior than the TDC channel. In contrast, in the event of overload, the WFD channel no longer supplies usable results and the TDC channel is used here, the distance noise is consistently less than 0.4 mm at all degrees of the signal overload. Optionally, the distance measurement can be executed multiple times (accumulation, moving average, etc.), accuracies in the micrometer range can thus be achieved.

It is obvious that these illustrated figures only schematically illustrate possible exemplary embodiments. The various approaches can also be combined with one another and with methods of the prior art.

What is claimed is:

1. A time measurement circuit for an incoming signal, the time measurement circuit comprising:
   a comparator circuit stage for generating a comparator output signal depending on a fulfillment of a criterion by the incoming signal, wherein exceeding or falling below a threshold value is defined as the criterion;
   a digitization circuit stage for sampling, which is performed at a defined sampling rate, of an input signal fed to the digitization circuit stage and converting it into digital data containing sampled values for the input signal;
   an evaluation circuit unit for determining a chronological location for the incoming signal by evaluating the digital data; and
   a signal generating stage interconnected between the comparator circuit stage and the digitization stage, which is configured to generate and output, in a chronologically fixed manner dependent on the content of the comparator output signal, an analog shape signal, which is configured for post-sampling interpolation ability, of known shape,
   wherein the evaluation circuit unit is configured to determine a time for the incoming signal while using a chronological interpolation of the values contained in the digital data and the known shape of the shape signal.

2. Time measurement circuit according to claim 1, wherein:
   the signal generating stage is configured such that the shape signal is pulsed with defined pulse width and changes its signal values asynchronously to the sampling rate of the digitization circuit stage multiple times within the pulse width, wherein the shape signal is formed as:
   bell-shaped,
   sawtoothed,
   triangular,
   trapezoidal, or
   stepped.

3. Time measurement circuit according to claim 1, wherein:
   the signal generating stage comprises at least one flip-flop circuit and a low-pass filter.

4. Time measurement circuit according to claim 1, wherein:
   the signal generating stage comprises at least one D flip-flop and a low-pass filter.

5. An optoelectronic distance meter according to the time-of-flight principle, the distance meter comprising:
   at least one light source for emitting at least one pulsed light signal, onto a target object, a receiving circuit having a detector for detecting the light signal returning from the target
   object and signal processing electronics downstream from the detector, and
   an evaluation circuit unit for determining a distance to the target object, wherein: a time measurement circuit according to claim 1 is provided as part of the signal processing electronics and the evaluation unit.

6. A distance meter according to claim 5, wherein:
   the comparator circuit stage of the time measurement circuit is configured and provided with criteria such that a comparator output signal is generated and output in each case for a rising flank and for a falling flank of the returning detected light signal,
   the evaluation circuit unit of the time measurement circuit is configured for determining a first time, that for the rising flank, and a second time, that for the falling flank, and
   the evaluation circuit unit of the distance meter is configured for deriving a distance to the target object depending on the determined first time and the determined second time.

7. A distance meter according to claim 5, wherein:
   the comparator circuit stage of the time measurement circuit is configured and provided with criteria such that a comparator output signal is generated and output in each case for a rising flank of the returning detected light signal depending on at least one first and one second set trigger threshold,
   the evaluation circuit unit of the time measurement circuit is configured for determining a first time, that for exceeding the first trigger threshold, and a second time, that for exceeding the second trigger threshold, and
   the evaluation circuit unit of the distance meter is configured for deriving a distance to the target object depending on the determined first time and the determined second time, wherein a quality specification about the distance determination is furthermore also derivable depending on the determined first time and the determined second time.

8. A distance meter according to any one of claim 5, wherein:
   the signal processing electronics have a first and a second channel, wherein
   the time measurement circuit is provided in the first channel and it is therefore provided for the case of an activation of the detector, which is caused by the returning light signal, in its middle and upper amplitude range, and
   the second channel is provided for the case of an activation of the detector, which is caused by the returning light signal, in its lower linear amplitude range and for this purpose has
   a digitization circuit stage for sampling, which is performed at a defined sampling rate, of the detected light signal and converting it into digital WFD data containing sampled values and
   an evaluation circuit unit for determining a chronological location of the detected light signal in consideration of a pulse shape, which is depicted on the basis of the sampled values, for the detected light signal,
   wherein the evaluation circuit unit of the distance meter is configured so that the distance to the target object—depending on the activation of the detector, which is caused by the returning light signal, in its middle and upper amplitude range or in its lower, linear amplitude range—is determinable on the basis of the digital data generated in the first channel or on the basis of the digital WFD data.

9. A distance meter according to any one of claim 5, wherein:
   the detector is configured as a receiver photodiode having a downstream amplifier stage, and having a low-noise trans-impedance amplifier element TIA.

10. A distance meter according to any one of claim 5, wherein:
    the evaluation circuit unit comprises an FPGA.

11. A distance meter according to any one of claim 5, wherein:
    the evaluation circuit unit comprises a microprocessor.

12. A distance meter according to any one of claim 5, wherein:
    the evaluation circuit unit comprises a DSP.

13. A distance meter according to any one of claim 5, wherein:
    an electronically adjustable damping element VGA is directly upstream of the comparator circuit stage of the time measurement circuit, wherein the damping is dynamically adaptable by the evaluation unit, optionally the FPGA.

14. A distance meter according to any one of claim 5, wherein:
    the distance meter and the evaluation circuit unit of the distance meter are configured for progressive determination, which is performed in real time, of distances, wherein the evaluation circuit unit is configured to output the distance.

15. A distance meter according to any one of claim 5, wherein:
    the distance meter and the evaluation circuit unit of the distance meter are configured for progressive determination, which is performed in real time, of distances, wherein the evaluation circuit unit is configured to output the distance, together with a derived amplitude for the returning light signal and a derived quality specification about the distance determination, at a rate in the range of 0.1 to 100 MHz.

16. Time measurement method for an incoming signal, the method comprising:
    progressive checking of a fulfillment of a defined criterion by the incoming signal and outputting a trigger signal upon fulfilling the criterion, wherein exceeding or falling below a threshold value is defined as the criterion,
    generating and outputting an artificial analog shape signal in a chronologically fixed manner depending on the output of the trigger signal, wherein the shape signal is configured for post-sampling interpolation ability and has known shape and known amplitude,
    sampling, which is performed at a defined sampling rate, of the shape signal and converting it into digital data containing sampled values for the shape signal, and
    deriving a point in time for the incoming signal by evaluation of the digital data, depending on a determination of a chronological location of the shape signal, which is performed using a chronological interpolation of the values contained in the digital data and the known shape of the shape signal.

17. Time measurement method according to claim 16, wherein:

the shape signal is pulsed having defined pulse width and changes its signal values asynchronously to the sampling rate multiple times within the pulse width, wherein the shape signal is formed as:

bell-shaped,
sawtoothed,
triangular,
trapezoidal, or
stepped.

18. Time measurement method according to claim 16, wherein:

the shape signal is pulsed having defined pulse width and changes its signal values asynchronously to the sampling rate multiple times within the pulse width progressively or continuously.

19. An optoelectronic distance measurement method according to the time-of-flight principle, the distance measurement method comprising emitting at least one pulsed laser light signal toward a target object, detecting the light signal returning from the target object, and determining a distance to the target object depending on a point in time derived for the returning light signal, wherein:

deriving the point in time for the returning light signal is performed using a time measurement method according to one of claim 16.

20. A time measurement circuit for an incoming signal, the time measurement circuit comprising:

a comparator circuit stage for generating a comparator output signal depending on a fulfillment of a criterion by the incoming signal, wherein exceeding or falling below a threshold value is defined as the criterion;

a signal generating stage interconnected between the comparator circuit stage and a digitization circuit stage, which is configured to generate, in a chronologically fixed manner dependent on the content of the comparator output signal, an analog shape signal of known shape, the digitization circuit stage for sampling, which is performed at a defined sampling rate, of an input signal fed to the digitization circuit stage, and converting it into digital data containing sampled values for the input signal; and an evaluation circuit unit for determining a chronological location for the incoming signal by evaluating the digital data;

wherein the input signal is provided by the analog shape signal and the analog shape signal is configured that interpolation of the values contained in the digital data is ensured; and wherein the evaluation circuit unit is configured to determine a time for the incoming signal while using a chronological interpolation of the values contained in the digital data and the known shape of the shape signal.

21. Time measurement circuit according to claim 20, wherein:

the signal generating stage is configured such that the shape signal is pulsed with defined pulse width and changes its signal values asynchronously to the sampling rate of the digitization circuit stage multiple times within the pulse width, wherein the shape signal is formed as:

bell-shaped,
sawtoothed,
triangular,
trapezoidal, or
stepped.

22. Time measurement circuit according to claim 20, wherein:

the signal generating stage comprises at least one flip-flop circuit and a low-pass filter.

23. Time measurement circuit according to claim 20, wherein:

the signal generating stage comprises at least one D flip-flop and a low-pass filter.

24. An optoelectronic distance meter according to the time-of-flight principle, the distance meter comprising:

at least one light source for emitting at least one pulsed light signal, onto a target object, a receiving circuit having a detector for detecting the light signal returning from the target object and signal processing electronics downstream from the detector, and an evaluation circuit unit for determining a distance to the target object, wherein:

a time measurement circuit according to claim 20 is provided as part of the signal processing electronics and the evaluation unit.

* * * * *